(12) United States Patent
Polk

(10) Patent No.: US 7,985,460 B2
(45) Date of Patent: Jul. 26, 2011

(54) COMPOSITE CONTAMINANT VAPOR BARRIER SYSTEM AND METHOD

(76) Inventor: David Polk, Derby, KS (US)

( * ) Notice: Subject to any disclaimer, the term of this patent is extended or adjusted under 35 U.S.C. 154(b) by 430 days.

(21) Appl. No.: 12/025,900

(22) Filed: Feb. 5, 2008

(65) Prior Publication Data

US 2009/0197042 A1  Aug. 6, 2009

(51) Int. Cl.
*B32B 3/10* (2006.01)
(52) U.S. Cl. ............ 428/137; 442/85; 442/86; 442/327; 442/381; 442/398; 427/138; 427/407.1
(58) Field of Classification Search .................... 442/85, 442/86, 327, 381, 398; 428/137; 427/138, 427/407.1
See application file for complete search history.

(56) References Cited

U.S. PATENT DOCUMENTS

| | | | |
|---|---|---|---|
| 4,168,924 | A | 9/1979 | Draper et al. |
| 5,027,572 | A | 7/1991 | Purcell et al. |
| 6,224,706 | B1 | 5/2001 | Matich |
| 6,544,661 | B1 | 4/2003 | Lee et al. |
| 6,898,917 | B2 | 5/2005 | Durning et al. |
| 6,901,712 | B2 | 6/2005 | Lionel |
| 7,037,864 | B2 | 5/2006 | Faucher |
| 7,219,479 | B2 | 5/2007 | Durning et al. |
| 2002/0164447 | A1 | 11/2002 | Asglan |
| 2004/0018358 | A1 | 1/2004 | Rieder et al. |
| 2004/0137813 | A1 | 7/2004 | Faucher |
| 2004/0249025 | A1 | 12/2004 | Dean |
| 2005/0173672 | A1 | 8/2005 | Hollabaugh et al. |
| 2005/0239189 | A1 | 10/2005 | Schaffner |
| 2005/0263460 | A1 | 12/2005 | Farone et al. |
| 2006/0000767 | A1 | 1/2006 | Trauger et al. |
| 2006/0003652 | A1 | 1/2006 | Faucher |

FOREIGN PATENT DOCUMENTS

| WO | WO 2004/051019 | 6/2004 |
|---|---|---|
| WO | WO 2007/038812 | 4/2007 |

OTHER PUBLICATIONS

Epro Waterproofing Systems, Miscellaneous Brochures.
Young, Lee W., Authorized Officer, ISA/US PCT Office, in International PCT Application No. PCT/US08/65457, International Search Report and Written Opinion, 8 pages.

*Primary Examiner* — Norca L Torres-Velazquez
(74) *Attorney, Agent, or Firm* — Donald L. Wenskay

(57) ABSTRACT

A composite membrane comprises: a first layer of high-density polyethylene (HDPE) and a layer of asphalt applied over the first layer of HDPE. A second layer of HDPE sheeting is applied over the layer of asphalt. A method of creating a composite barrier to chemical vapors is also disclosed which comprises applying a base layer comprising high density polyethylene (HDPE); applying an asphalt layer over the base layer; and applying a top layer comprising HDPE over the asphalt layer.

26 Claims, 4 Drawing Sheets

COMPOSITE CONTAMINANT VAPOR BARRIER SYSTEM AND METHOD

BACKGROUND OF THE INVENTION

The present invention generally relates to apparatus and methods for providing vapor barriers and, more specifically, to apparatus and methods of inhibiting the migration of harmful vapors from the ground.

Many parcels of land are contaminated with harmful substances. Some sites may be contaminated by naturally occurring substances, such as Radon, or Methane. More commonly, sites are contaminated by industrial or commercial uses. For example, land and groundwater often becomes contaminated by factories, chemical processing plants, dry cleaning facilities, gasoline service stations, landfills and other facilities. When such parcels of land are no longer needed for these operations, they may sit idle because of the high cost of removing the contaminants.

In some cases, land has been contaminated by such high levels of hazardous waste or pollution that it is considered un-developable. Such sites are sometimes designated as hazardous waste sites or Superfund sites. In other cases, the level of contamination, and the cost to restore the land, may be low enough that the land is a candidate for redevelopment. In the U.S., such sites are often referred to as "Brownfields". There has been an increase in the number of developments on Brownfields partly because these sites often exist in high-population density areas where there is a great demand for developable land.

Because of these trends, there has been an increased demand for economical ways to make Brownfields suitable for redevelopment. In some cases the contaminants may be removed. In many cases, however, it is either not possible, or practical, to remove all of the contaminants. In these cases, development may still be possible if ways are found to protect future occupants of the site from exposure to the hazardous substances at the site. One way to do this is to incorporate a barrier beneath newly constructed buildings that will inhibit the upward migration of chemical contaminants into the construction materials and indoor air space of the structure.

Unfortunately, past techniques for providing effective barriers to hazardous substances to make land safe for redevelopment have had a number of drawbacks, including high cost and difficulties in installation, or they may have not provided an adequate level of isolation from contaminant vapors. For example, various forms of polyolefin sheeting have been used as barriers to contaminant vapor intrusion. These may comprise low and medium density polyethylene, which is laid down in an overlapping pattern. The overlaps are then chemically sealed or heat welded to produce a continuous sheet. Penetrations through the membrane (e.g. sewer piping, electrical conduit, etc.) are sealed by wrapping and mechanically binding the membrane to the penetrating object. The use of these membrane materials for vapor barrier application is very labor intensive as the seam binding/welding and mechanical sealing of penetrations requires significant time by skilled technicians to ensure membrane integrity.

Latex modified asphalt sprays have also been used as a low cost alternative vapor barrier. Typically, the material is spayed onto the ground surface. In some cases, the asphalt may be applied over a typical geo-textile fabric, which serves to add tensile strength, but is not a barrier to vapor movement. During application, when encountering a penetration (e.g. conduit protruding upward) sealing around the protrusion is easily accomplished by spraying the asphalt-based material from the ground surface up to and contacting the protrusion, thus making a continuous seal. Asphalt-based membranes have been shown to perform well as barriers to water, but have limited ability to inhibit volatile organic vapors (e.g. gasoline, degreasing solvents, etc.) commonly found on previously polluted properties. In fact these membranes will be degraded by many of the chemicals commonly found on polluted sites (benzene, perchloroethene, etc.).

As can be seen, there is a need for improved ways to provide a barrier to hazardous materials that protects occupants of contaminated land, in a way that is effective, economical and easy to install. There is also a need for a contaminant vapor barrier that is easy to install on buildings which have penetrations through the barrier surface. There is also a need for a contaminant vapor barrier that is not degraded by the chemicals present on polluted sites.

SUMMARY OF THE INVENTION

In one aspect of the present invention, a composite membrane comprises: a first layer of high-density polyethylene (HDPE); a layer of asphalt applied over the first layer of HDPE; and a second layer of HDPE sheeting applied over the layer of asphalt.

In another aspect of the present invention, a method of creating a composite barrier to chemical vapors comprises: applying a base layer comprising high density polyethylene (HDPE); applying an asphalt layer over the base layer; and applying a top layer comprising HDPE over the asphalt layer.

In a further aspect of the invention, a method of constructing a building comprises: applying a base layer comprising polyethylene against a ground surface; applying an asphalt layer against the base layer; applying a top layer comprising polyethylene against the asphalt layer; and pouring a concrete layer against the top layer.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a composite membrane system that may be placed directly on the ground surface prior to erecting a building on site. The resulting membrane system serves to inhibit vapors from upward migration into the construction materials and indoor air space of the structure. The composite membrane system of the present invention may be employed horizontally, beneath a concrete floor. Alternatively, embodiments may be employed in vertical configurations, such as between a below-grade wall and the adjacent soil. The present invention may also find applications on contaminated sites besides buildings, for example, to provide a contaminant vapor barrier under playgrounds and other recreational developments or under parking lots. The present invention may also provide protection from a range of contaminant vapors including those from petroleum-based products and chlorinated hydrocarbons.

Embodiments of the invention may provide a composite membrane system comprising various combinations of polyethylene sheeting and latex modified asphalt. The composite membrane system may be placed between the foundation of a building and the soil pad to eliminate vapor exposure pathways and to stop contaminated vapors from permeating through the slab. The present invention is not susceptible to chemically induced materials breakdown, punctures, and seam weakness resulting from poor detail work and/or application installation imperfections around penetrations. In some prior vapor barrier systems, asphaltic layers were susceptible to chemical breakdown. Prior vapor barriers employing polyethylene sheeting were difficult to install and were prone to vapor pathways around penetrations or seams.

Figure 1:
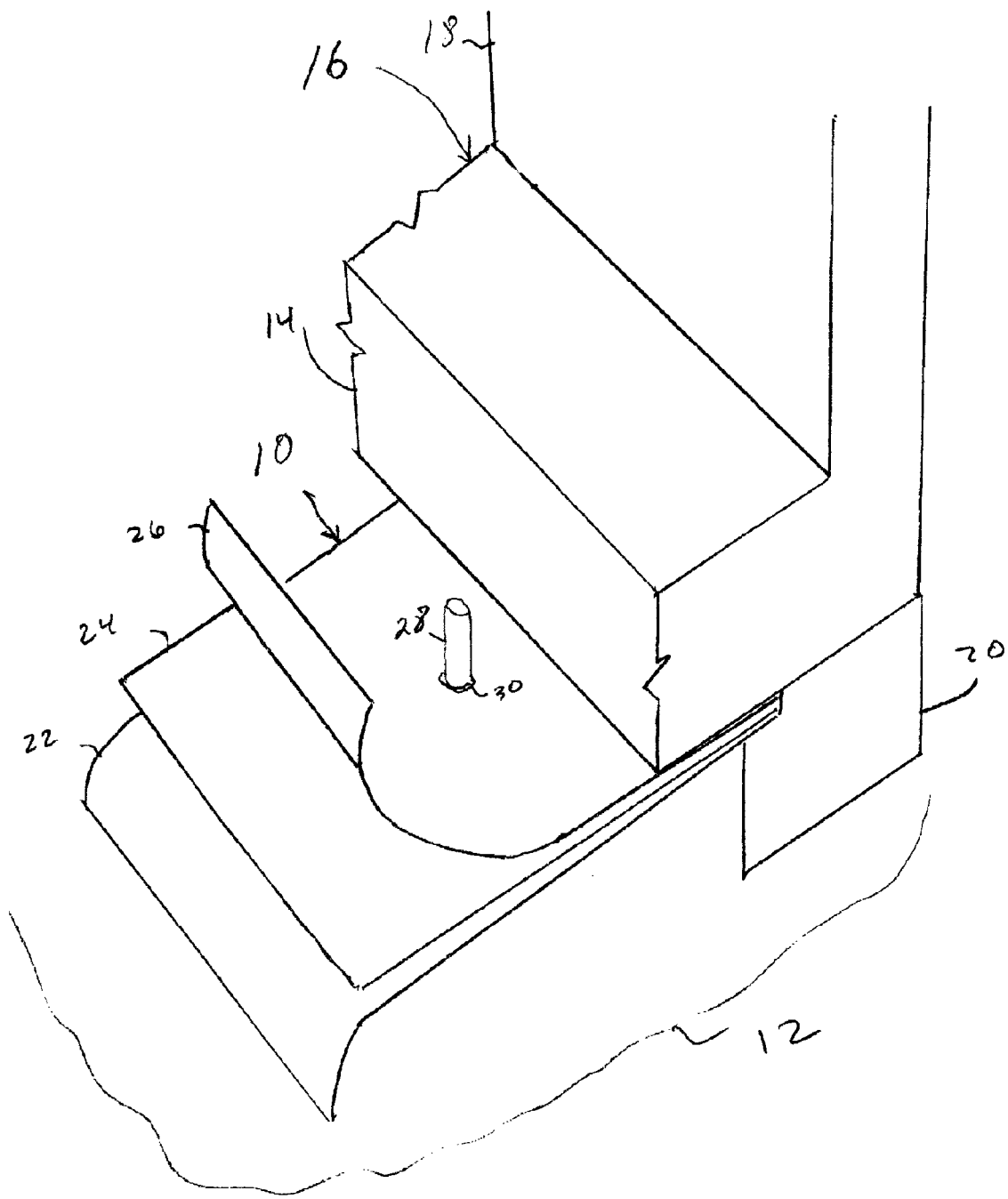
FIG. 1 is a partial perspective cut-away view of a partially constructed building utilizing the composite contaminant vapor barrier according to an embodiment of the present invention.

FIG. 1 is a partial perspective cut-away view of a partially constructed building utilizing the composite membrane contaminant vapor barrier system according to an embodiment of the present invention. The vapor barrier 10 is installed directly on the soil 12 of a building pad. A concrete slab floor 14 is installed on top of the vapor barrier 10. The floor 14 may be part of a building 16, which includes a wall 18 and a footing 20.

The vapor barrier 10 is constructed on-site by laying down a base layer 22, which may comprise HDPE sheeting, directly onto the building pad soil 12. HDPE provides chemical resistance, high tensile strength, and stress-crack resistance. The edges of individual sections of the base layer 22 are overlapped and bonded together, as described below.

A core layer 24 of asphalt in an emulsion form is layered directly over the base layer 22. The core layer 24 may comprise an elastic co-polymer modified asphaltic membrane that may be spray-applied or applied by hand directly over the base layer 22. The core layer 24 provides additional protection against vapor transmission and insures proper sealing of potential vapor pathways. The core layer also serves to secure the overlapping edges to the base layer 22 as well as attach the vapor barrier 10 to the building surfaces. The core layer 24 also creates an effective seal around slab penetrations, such as pipes, conduits and building structures that penetrate the vapor barrier 10. One example of a penetration is pipe 28 which protrudes through an opening 30 in the vapor barrier 10. As a result, the need for expensive mechanical fastening at termination points is eliminated. Furthermore, the core layer 24 serves to protect the base layer from potential damage during construction on the site.

A bond layer 26 is applied over the core layer 24. The bond layer 26 may comprise the same material as the base layer 22, which in the present embodiment is HDPE. The bond layer 26 helps protect the system from getting punctured after installation and provides a final layer of chemical resistance. The resulting vapor barrier 10 with the combination of the base layer 22, the core layer 24 and the bond layer 26 is a vapor barrier that is resistant to even very concentrated chemical pollutant vapors, is puncture resistant and is economical to install.

Figure 2:
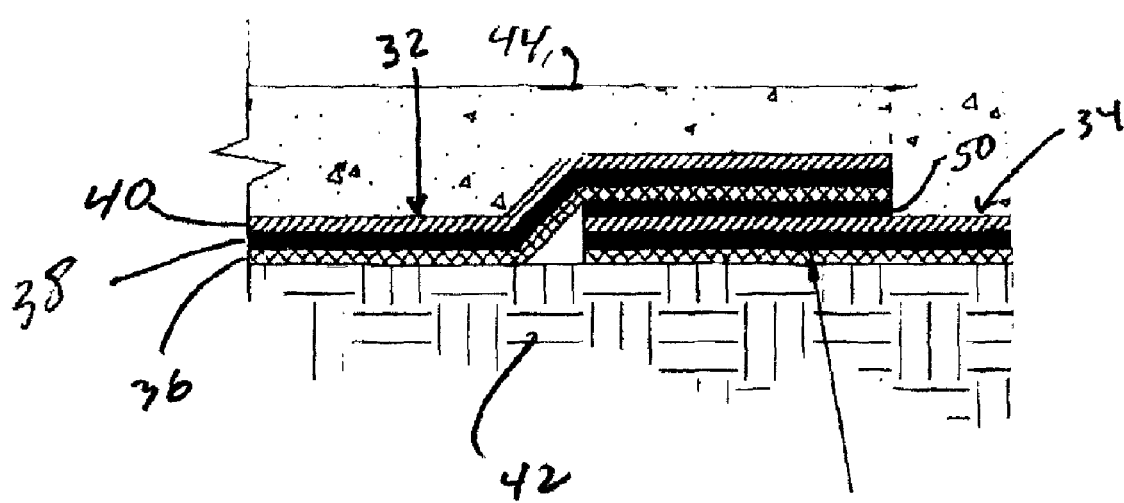
FIG. 2 is cross-sectional view of a below-grade floor of a building having overlapping sections of a composite contaminant vapor barrier according to an embodiment of the present invention.

FIG. 2 shows a cross-sectional view of a below-grade floor of a building having overlapping sections of the vapor barrier according to another embodiment of the present invention. In this embodiment, two overlapping adjacent sections of the vapor barrier are shown. In particular, a vapor barrier 32 is shown overlapping an adjacent vapor barrier 34. Vapor barriers 32 and 34 may each include a base layer 36, a core layer 38 and a bond layer 40 that are similar to the corresponding layers shown in FIG. 1. Vapor barriers 32 and 34 are installed directly on the soil 42 of the building pad. A floor 44 comprises a poured concrete slab installed directly over the vapor barriers 32 and 34.

In the region where vapor barriers 32 and 34 overlap, an additional asphaltic layer 50 may be applied between the two layers. This insures that the two layers are firmly and sealingly attached to each other. This asphaltic layer may be identical to the core layer 38 and may be applied in the same manner as the core layer 38. In other embodiments, other sealing materials may be applied to form a seal between the two vapor barriers 32 and 34. Also, in additional embodiments, instead of overlapping the vapor barriers 32 and 34, the edges of the two vapor barriers may be placed adjacent to each other and a sealing material placed across the edges. In other embodiments, one or both of vapor barriers 32 and 34 may be entirely, or partially, disposed in a vertical orientation, for example, against a vertical wall of soil (not shown). In this vertical orientation, a below-grade concrete wall (not shown) may be installed on the side of the vapor barrier opposite the soil.

Figure 3:
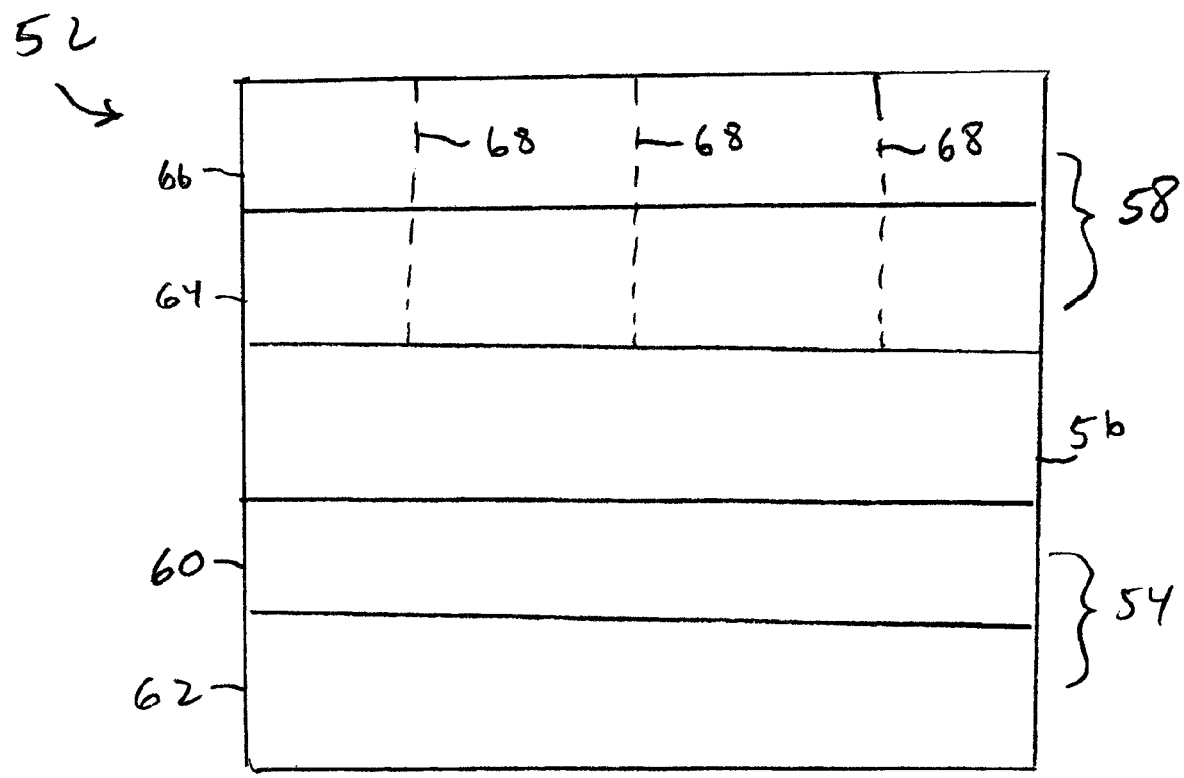
FIG. 3 is a cross-sectional view of a composite contaminant vapor barrier according to an embodiment of the present invention.

FIG. 3 shows a cross-section of a composite vapor barrier 52 in accordance with an alternative embodiment of the invention. Vapor barrier 52 includes base 54, core 56 and bond 58 layers, as described above. However, in this embodiment, the base 54 and bond 58 layers have an additional layer added to them. In particular, the base layer 54 includes an HDPE layer 60 with a geo-textile layer 62 bonded to its bottom surface. Geo-textile layer 62 provides a friction course between the base layer 54 and the soil. This inhibits movement between the base layer 54 and the soil during installation. The geo-textile layer 62 may comprise a coating of unwoven spun polypropylene fibers. In one embodiment, the base layer 54 comprises the product Geo-Seal Base, core layer 56 comprises the product Ecoline S, and the bond layer 58 comprises the product Geo-Seal Bond, all three products being available from Land Science Technologies Division of Regenesis Corporation of San Clemente, Calif.

The core layer 56 may be identical to the core layers 24 and 38 described above. The bond layer 58 may comprise a layer of HDPE 64 with a geo-textile layer 66 bonded to its top surface. Like the geo-textile layer 62, geo-textile layer 66 may comprise a coating of unwoven spun polypropylene fibers. The geo-textile layer 66 provides and effective bond between the vapor barrier 52 and the adjacent concrete slab.

The bond layer 58 may also have a series of perforations 68 passing through it. These perforations may serve two functions. They allow for water vapors that occur upon the dehydration curing of the latex modified asphalt in the core layer 56 to move upwards. Also, upon laying the concrete structural slab on the bond layer, the perforations 68 allow water penetration and vaporization to aid in the curing of the concrete slab.

Figure 4:
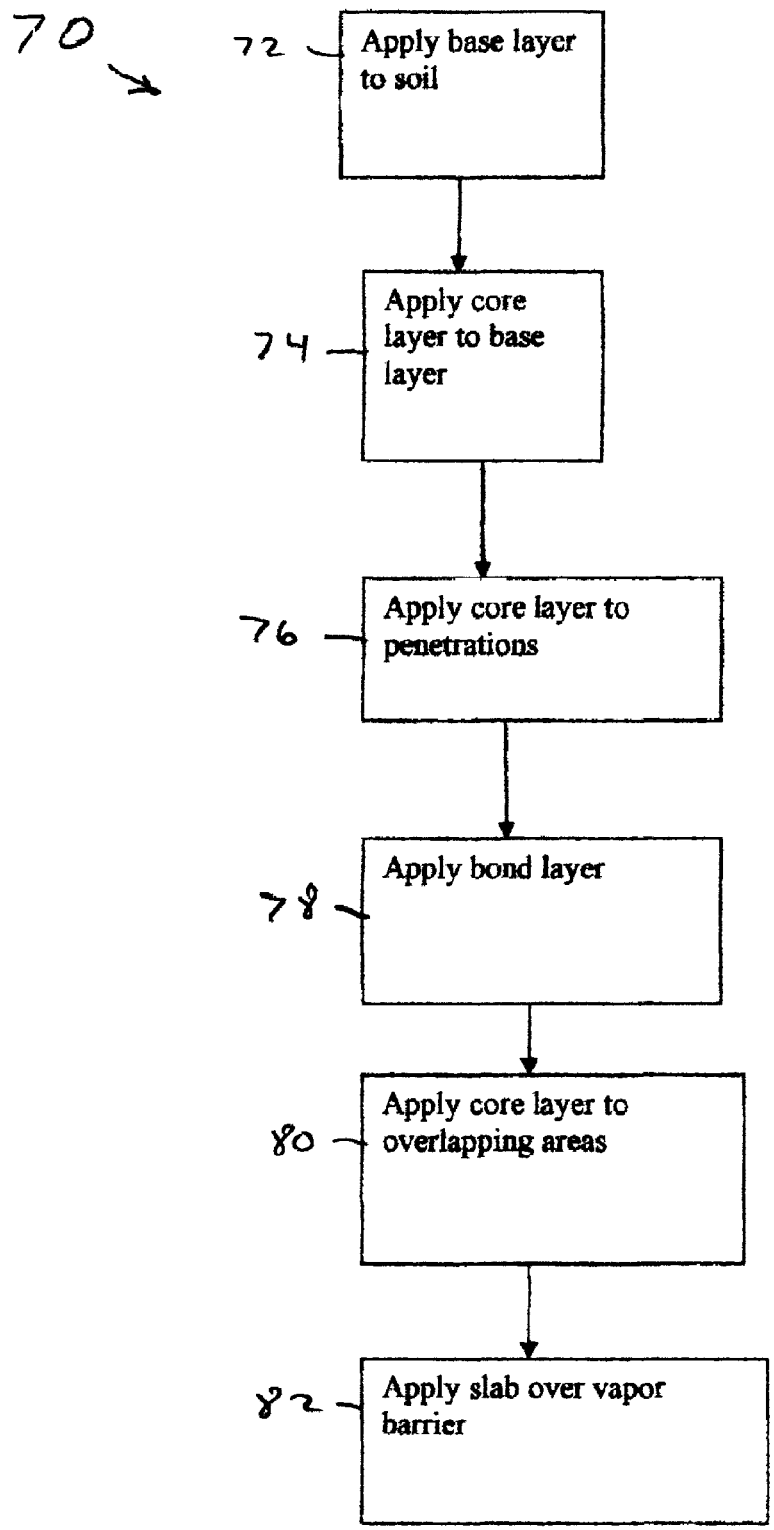
FIG. 4 is a flow chart of a method of preventing contaminant vapors from entering a building.

FIG. 4 shows a flow chart of a method of preventing contaminant vapors from entering a building. In step 72 a sheet of the base layer is applied to the soil. This may comprise, for example base layers 22, 36 or 54. This step may also include adding openings for penetrations, such as opening 30. The core layer is then applied on the base layer in step 74. This may comprise core layer such as core layers 24, 38 or 56. In step 76 the base layer is also applied to the penetrations and edge regions of the base layer. This may include penetrations, such as pipe 28 and opening 30 as well as the perimeter edges of the base layer.

In step 78, the bond layer, such as bond layers 26, 40 or 58, is applied to the core layer. In step 80 an additional core layer may be applied to the top of the bond layer where it will overlap with an adjacent vapor barrier. For example this may comprise the region of bond layer 50 as shown in FIG. 2. Finally, a concrete slab is installed on top of the bond layer in step 82. This slab may be, for example, slab 14, 44 or 49.

As can be appreciated by those skilled in the art, the present invention provides a composite contaminant vapor barrier system and method. The vapor barrier may be economically installed on-site directly on contaminated soil. The vapor barrier is effective in inhibiting the upward migration of vapors into a building constructed over the vapor barrier. The vapor barrier is resistant to puncturing. Penetrations, such as pipes, passing through the vapor barrier are easily sealed by the sprayed-on core layer. Also, the materials used in the vapor barrier are not susceptible to chemical breakdown.

It should be understood, of course, that the foregoing relates to exemplary embodiments of the invention and that modifications may be made without departing from the spirit and scope of the invention as set forth in the following claims.

I claim:

1. A composite membrane comprising:
a first layer of high-density polyethylene (HDPE) sheeting;
a layer of asphalt applied over said first layer of HDPE, said asphalt layer including water on its upper surface resulting from dehydration curing of said asphalt; and
a second layer of HDPE sheeting applied over said layer of asphalt, wherein said second layer of HDPE sheeting is perforated and said perforations facilitate the curing of said asphalt by dehydrating said asphalt by allowing said water to pass from said layer of asphalt through said perforations.

2. The composite membrane of claim 1 wherein said asphalt layer is a sprayed-on asphalt layer.

3. The composite membrane of claim 1 wherein said asphalt layer is a hand-applied asphalt layer.

4. The composite membrane of claim 1 wherein said asphalt layer comprises modified latex asphalt.

5. The composite membrane of claim 1 wherein said asphalt layer is applied in an emulsion over said first layer of HDPE.

6. The composite membrane of claim 1 wherein said first layer of HDPE has openings to permit objects to pass through and said asphalt layer is applied to said objects, thereby forming a seal between said objects and said first layer of HDPE.

7. The composite membrane of claim 1 further comprising a first geo-textile layer on the bottom of said first layer of HDPE.

8. The composite membrane of claim 7 wherein said first geo-textile layer comprises an unwoven geo-textile fabric.

9. The composite membrane of claim 7 further comprising a second geo-textile layer on the top of said second layer of HDPE.

10. The composite membrane of claim 9 wherein said second geo-textile layer comprises an unwoven geo-textile fabric.

11. A method of creating a composite barrier to chemical vapors comprising:
applying a base layer comprising high density polyethylene (HDPE) on a surface;
applying an asphalt layer over said base layer, said asphalt layer including water on its upper surface resulting from dehydration curing of said asphalt;
applying a top layer comprising perforated HDPE over said asphalt layer; and
curing said asphalt layer by allowing said water to pass from said asphalt layer through said perforations.

12. The method of claim 11 wherein said step of applying a base layer comprises applying said base layer over ground.

13. The method of claim 11 wherein said base and top layers have openings and further comprising:
passing objects through said openings; and
said applying an asphalt layer includes applying an asphalt layer to said object after they have been passed through said openings in said base layer.

14. The method of claim 11, wherein said base layer, asphalt layer and top layer comprise a first composite barrier, said method further comprises creating a second composite barrier including a second base layer comprising HDPE, a second asphalt layer over said second base layer; and a second top layer comprising HDPE over said second asphalt layer.

15. The method of claim 14 further comprising:
applying a layer of asphalt on said top layer of said first composite layer in an area adjacent to an edge of said first composite barrier; and
placing said second composite barrier partially overlapping said first composite barrier over said layer of asphalt on said top layer of said first composite layer.

16. A method of constructing a building comprising:
applying a base layer comprising polyethylene against a ground surface;
applying an asphalt layer against said base layer, said asphalt layer including water on its upper surface resulting from dehydration curing of said asphalt;
applying a top layer comprising perforated polyethylene against said asphalt layer;
pouring a concrete layer against said top layer before allowing said water on said asphalt layer to dry;
dehydrating said asphalt layer by allowing said water to pass from said asphalt layer through said perforations in said perforated polyethylene layer; and
hydrating said concrete layer by allowing said water passing from said asphalt layer through said perforations to pass into said concrete layer.

17. The method of claim 16 wherein said base layer and said top layer comprise high density polyethylene.

18. The method of claim 16 wherein said step of applying a base layer comprises applying said base layer on a horizontal ground surface.

19. The method of claim 16 wherein said step of applying a base layer comprises applying said base layer on a vertical ground surface.

20. The method of claim 16 wherein said base layer of polyethylene has openings to permit objects to pass through and further comprising applying said asphalt layer to said objects, thereby forming a seal between said objects and said base layer of polyethylene.

21. The method of claim 16 further comprising applying a first geo-textile layer on the bottom of said first layer of polyethylene.

22. The method of claim 21 wherein said first geo-textile layer comprises an unwoven geo-textile fabric.

23. The method of claim 16 further comprising applying a second geo-textile layer on the top of said second layer of polyethylene.

24. The method of claim 23 wherein said second geo-textile layer comprises an unwoven geo-textile fabric.

25. The composite membrane of claim 1 further comprising a layer of concrete applied over said second layer of HDPE sheeting before said water on said asphalt layer has dried, wherein said perforations facilitate the curing of said concrete by allowing said water to pass from said asphalt layer during curing of said asphalt into said concrete during the curing of said concrete.

26. The method of claim 11 further comprising:

applying a layer of concrete over said top layer of perforated HDPE before allowing said water on said asphalt layer to dry; and curing said concrete by allowing said water passing from said asphalt layer through said perforations to pass into said concrete layer.

* * * * *